Feb. 7, 1961

G. F. HILL 2,970,570

HYDRAULIC VIBRATOR

Filed March 23, 1959

INVENTOR.
GILBERT F. HILL

BY
Richard von H. Bruns
Atty.

INVENTOR.
GILBERT F. HILL

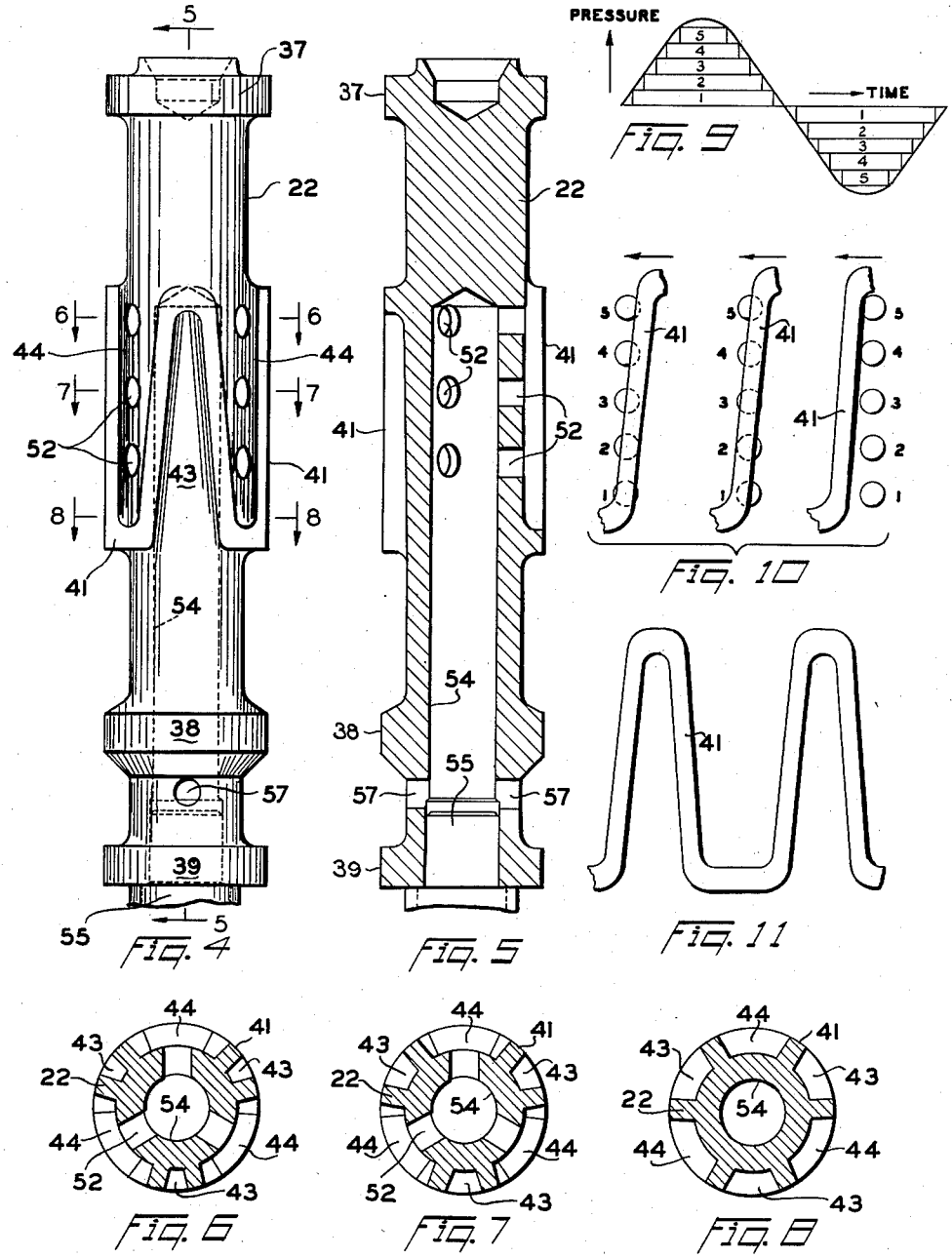

United States Patent Office 2,970,570
Patented Feb. 7, 1961

2,970,570

HYDRAULIC VIBRATOR

Gilbert F. Hill, Skaneateles, N.Y., assignor to L.A.B. Corporation, Skaneateles, N.Y., a corporation of New Jersey Filed Mar. 23, 1959, Ser. No. 801,179

16 Claims. (Cl. 121—16)

This invention relates generally to vibration test equipment, and has particular reference to a novel hydraulic vibrator which is capable of converting constant pressure into sinusoidal vibration and obtaining both high frequencies and high force output.

Vibration is a common phenomena which is associated with almost every form of moving device. Since the reversing stresses resulting from vibratory or oscillatory motion cause fatigue in metals, and because destructive resonances may occur when a system is vibrated at its natural frequency, there is a strong demand in industry for vibration test equipment capable of simulating these conditions at precisely controlled levels. Heretofore, the most common way of driving vibration test equipment at high frequencies has been by electromagnetic means. Electromagnetic vibrators, however, are relatively expensive and are generally incapable of a very high force output.

Because of the need for vibration test equipment capable of both high frequencies and high force output, a considerable amount of effort has been expended in recent years towards developing other means for driving the test equipment. The use of hydraulic power for producing vibration has had special appeal in this connection because very large forces can be produced in an extremely compact mechanism. Moreover, a comparative small, easily operated valve can be used to direct the pressure and thereby produce vibration through the reversal of force on a double acting piston.

In spite of the advantages of hydraulic power, its application to vibration test equipment has proved difficult due to liquid flow characteristics that inhibit the function of valves, lines, cylinders and other hydraulic components. These conditions have been aggravated by the configuration of conventional hydraulic equipment which is unsuited to rapid response. In addition, a simple hydraulic valve has the disadvantage that a sudden full opening of the valve will cause full pressure to be applied almost instantly to the piston. This force applied to a given mass of the test load will cause a predictable acceleration of the total mass attached to the piston. When the pressure is applied suddenly to the piston area, the resultant acceleration would rise instantly to its full value and the wave form which represents this change of acceleration would be square.

Practically all natural vibration, however, is in the form of sinusoidal motion in which displacement varies sinusoidally with respect to time. Due to this natural condition and the mathematical ease with which a sinusoidal function can be described and measured, the use of sinusoidal vibration has become a standard test method and is the desirable end result in vibration test equipment. To obtain sinusoidal vibration, it is possible by means of tapered or notched valves to restrict flow during the opening of the valve and thereby moderate the sudden rise in pressure. This method is practicable for only a very limited set of conditions since the degree of taper or notching must be altered to suit the fluid velocities associated with each set of performance conditions in order to produce the desired perfection of sinusoidal wave form. These various methods of moderating the pressure rise in throttling or metering the flow of fluid through the valve or allowing fluid to leak from one side of a piston to the other result in lower efficiency of the hydraulic device.

The present invention has overcome the major disadvantages inherent in the use of hydraulic power by providing a hydraulic vibrator or vibration generator in which flow paths have been reduced to a minimum by incorporating the valve within the piston structure, and the available motion of the piston has been held to a level compatible with high frequency operation. In addition, the piston and valve incorporate a novel principle which causes pressure to be applied in sequence to multiple increments of piston area so that there is a progresive change in the resultant force output. This construction is proportioned to produce a sinusoidally changing force output from a constant pressure input. In this development, the valve does not throttle the flow of fluid in order to sinusoidally vary the pressure applied to the piston, and therefore the pressure of the hydraulic power supply directly determines the total output force at which the generator operates.

With the foregoing and other considerations in view, therefore, it may be stated that the primary object of the invention is to provide a vibration test device which is capable of producing high frequencies and high force output by means of hydraulic power.

Another important object of the invention is to provide a hydraulic vibrator or vibration generator which is capable of converting constant pressure into sinusoidal vibration.

A further important object of the invention is to provide a hydraulic vibrator having a very compact construction.

Still another important object of the invention is to provide a hydraulic vibrator wherein the pressure of the hydraulic power supply determines directly the total output force at which the vibrator operates.

A further important object of the invention is to provide a hydraulic vibrator wherein the flow paths have been reduced to the practical minimum.

A more specific object of the invention is to provide a hydraulic vibrator wherein the valve structure is located within the piston structure, and the latter is externally mounted on the equipment.

Another specific object of the invention is to provide a hydraulic vibrator wherein the piston area is divided into multiple increments of area, and the pressure is applied progressively to these increments to produce a substant.ally sinusoidally changing force output from a constant pressure input.

Other objects and advantages of the invention will become apparent from the following detailed description thereof read in conjunction with the accompanying drawings which illustrate a representative embodiment of the invention for the purpose of disclosure.

In the drawings:

Figure 4 is a side elevation of the valve rotor;

Figure 5 is a vertical elevation taken substantially along line 5—5 of Figure 4;

Figures 6, 7 and 8 are horizontal sections through the valve rotor taken substantially along lines 6—6, 7—7 and 8—8, respectively;

Figure 9 is a schematic diagram showing the method by which the output force of the various piston areas is added together in varying lengths of time in order to produce an effective sinusoidal rise and fall in the force on each side of the piston;

Figure 10 is a schematic diagram illustrating the progressive opening of a group of fluid ports by means of the valve land; and Figure 11 is a developed circumferential layout of a portion of the valve land.

Figure 1:
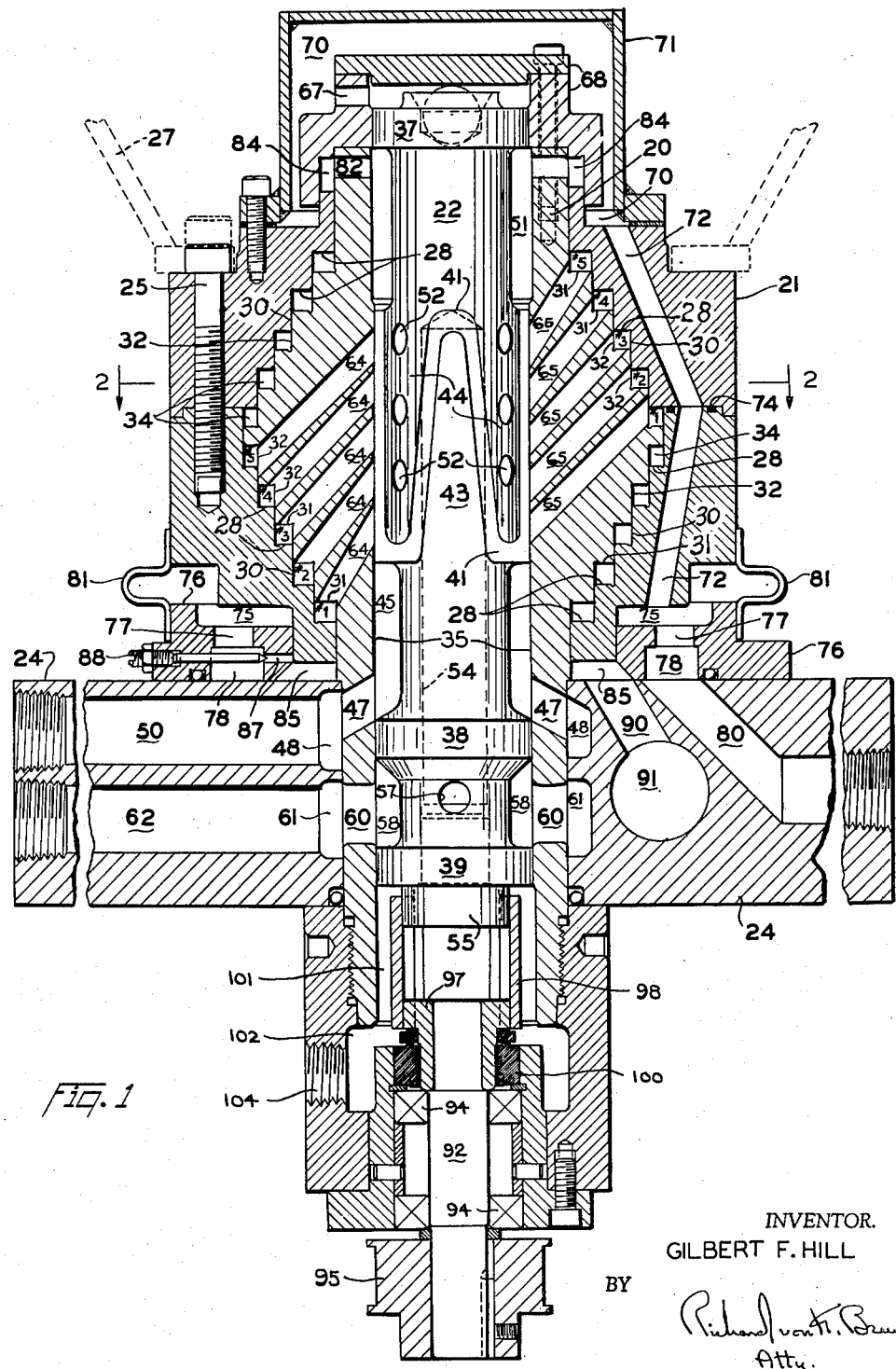
Figure 1 is a vertical section through a hydraulic vibrator embodying the present invention.
Figure 2:
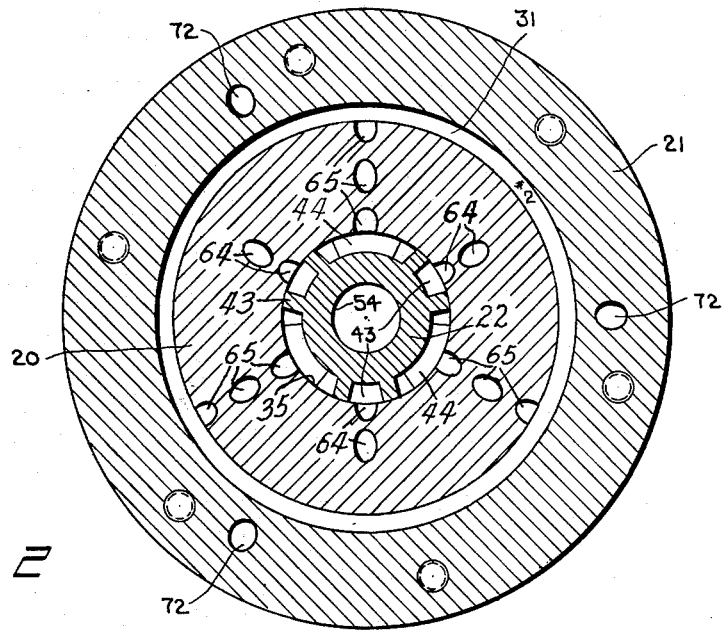
Figure 2 is a horizontal section taken substantially along line 2—2 of Figure 1.

Having reference now to the drawings, wherein like reference numbers designate the same part in each of the views, and with particular reference to Figure 1, the hydraulic vibrator is essentially comprised of only three principal parts which are the stator 20, the piston 21 mounted externally of the stator, and the valve rotor 22 mounted internally of the stator. The stator is fixed to a base plate or block 24 that is adapted to be rigidly attached to some form of reaction mass (not shown). The reaction mass can be either a seismically suspended mass or a large foundation block resting on the ground.

The piston 21, which is hollow and encircles the stator coaxially, comprises an upper and a lower ram that are secured together as by bolts 25, these bolts also serving as the attachment means for the equipment to be vibrated as is indicated by dash lines at 27. Unlike a conventional piston having but a single pair of unified piston areas, the piston 21 is formed with a series of increments of area which control the rise in the force produced by the piston as will be described more fully hereinafter. In the embodiment shown, these increments of area comprise a plurality of pairs of annular interior shoulders 28 which are arranged in stepped relation axially of the piston from its mid-section to each end.

Figure 3:
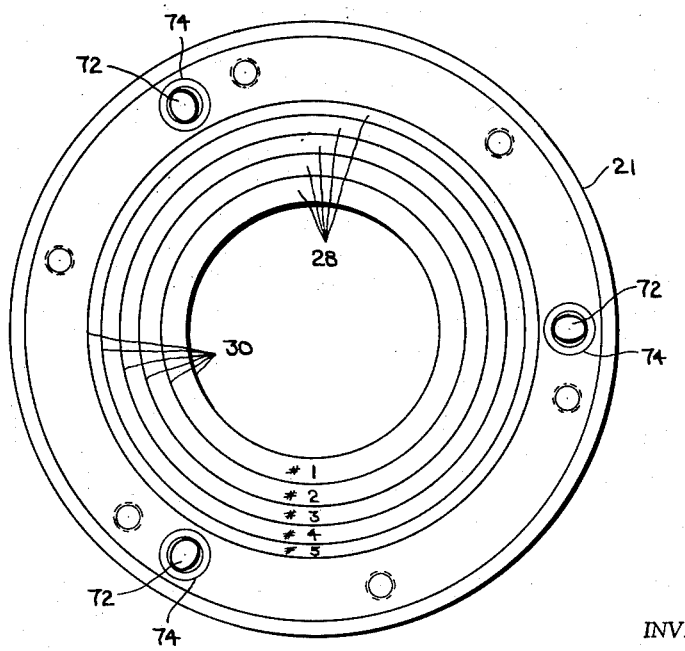
Figure 3 is a top plan view of the lower ram which forms the lower portion of the piston.

The annular shoulders or piston areas 28 lie in planes normal to the longitudinal axis of the piston and stator, and adjacent shoulders are separated by axially extending cylindrical surfaces 30, Figures 1 and 3. The shoulders are equal in area because the widths thereof gradually decrease as their distances from the axis increases. Thus, the pair of shoulders adjacent the ends of the piston which has the shortest radii are considerably wider than the pair of shoulders adjacent the mid-section of the piston which has the longest radii. By applying pressure in sequence or successively to these equal area shoulders on either the upper or lower side of the piston, the force rises progressively up to the maximum which is determined by the sum of the areas and the pressure.

The stator 20 is formed on its exterior with a plurality of pairs of stepped annular shoulders 31 that correspond to and confront the piston shoulders 28, the stator shoulders also being disposed in planes normal to the stator axis. The stator shoulders are separated by axially extending cylindrical surfaces 32 which slidably engage the corresponding cylindrical surfaces 30 of the piston. When the piston is in mid-position as shown in Figure 1, the piston shoulders are spaced from stator shoulders and define with the cylindrical surfaces 30 and 32 a fluid receiving chamber 34 adjacent each piston area.

Stator 20 is formed with a central axial passageway 35 in which the valve rotor 22 is coaxially mounted. The valve is adapted to be rotated by a means to be presently described, and is provided adjacent its ends with unbroken cylindrical surfaces 37, 38 and 39 which form a natural journal for an oil film bearing and permit the valve to operate at high speeds without any metallic contact between it and the stator which forms the valve body. Intermediate the bearing surfaces the valve has a reduced diameter, and in the area of the piston and stator shoulders it is formed with a continuous land 41 which, like the bearing surfaces, is separated from the passageway walls by an oil film.

The land 41 has a sinuous or generally sinusoidal configuration and serves to divide the valve rotor into a plurality of independent high and low pressure areas or passages which are alternately disposed about the periphery of the valve intermediate the up and down reaches or legs of the land, see Figures 4, 5 and 11. In the illustrated embodiment of the invention, there are three high pressure passages 43 and an equal number of low pressure passages 44, Figures 6–8, the high pressure passages being open at the bottom of the land and closed at the top while the low pressure passages have just the reverse arrangement.

The high pressure passages 43 open into or communicate with an annular area 45 which surrounds the reduced diameter portion of the valve between the land and bearing surface 38, and fluid under pressure is delivered to this area through a plurality of radial ports 47 in the stator, see Figure 1. Ports 47 communicate with an annular passage 48 formed in the base block 24, and passage 48 connects with a bore 50 in the block which is adapted to be connected at its outer end to a suitable conduit leading to the hydraulic power supply (not shown).

The low pressure passages 44 open into a similar annular area 51 which surrounds the reduced portion of the valve between the land and upper bearing surface 37. Some of the lower pressure fluid which enters the area 51 escapes due to leakage but the excess is carried off through ports 52 in the valve itself which ports connect the low pressure passages with an axial bore 54 in the valve. As is best shown in Figure 5, the upper end of this bore terminates adjacent the upper side of the land and the lower end thereof is closed by a plug 55. Above the plug, radial ports 57 connect the bore with an annular area 58 around the valve between bearing surfaces 38 and 39, and this area is in turn connected by radial ports 60 in the stator to an annular passage 61 in the block. From passage 61, the return oil passes out through a bore 62 in the block which is adapted to be connected to a conduit leading to the oil reservoir. However, the return line is kept under pressure through the action of a relief valve in order to secure rapid reversible flow for each piston area and prevent cavitation.

Extending radially outwardly from the central passageway 35 of the stator to the fluid receiving chambers 34 adjacent each piston area are a plurality of ports or fluid passages, each piston area having one such port for each high pressure passage 43 on the valve rotor. Since there are three high pressure valve passages in the embodiment disclosed, there will be three ports for each piston area, and the ports corresponding to each high pressure passage are arranged in axially aligned groups for the piston areas on each side of the piston. Thus, in Figure 1 there is shown one of the groups of ports 64 to the piston areas on the lower side of the piston and one of the groups of ports 65 to the piston areas on the upper side of the piston. The groups of ports to the opposite sides of the piston are alternately arranged and, since there are three such groups for each side, they will be spaced at 60° intervals around the stator, see Figure 3. As is clearly shown in Figure 1, all of the ports are inclined so that they open into the same area of the central passageway 35, which arrangement allows the use of a shorter valve and reduces the leakage between the high and low pressure passages thereof.

The configuration of the valve land 41 is proportioned so that when the valve is rotated at a constant speed the piston areas 28 are connected to pressure at a rate which approximates a sinusoidal wave form. The valve also reduces the area under pressure in a similar manner. This rise and fall in area causes one-half cycle of a sinusoidally varying force to be developed. A continuing rotation of the valve then applies pressure to the piston areas on the opposite side of the piston. This action completes one full sinusoidal force cycle.

To illustrate the action just described, the piston areas have been numbered from 1 to 5 for each side of the piston in Figure 1, and as the valve 22 rotates to the right as viewed in Figure 1, the group of ports 65 which are shown on the right will be connected to the fluid in a high pressure valve passage 43 in the following manner. Since the reach of the land bordering the right side of passage 43 is angularly disposed, it will first pass across and open the port for piston area #1 to the high pressure fluid, then pass across and open the port for piston area #2, and so on until all five piston areas are in communication with the high pressure passage. However, because of the divergence of the land reaches bordering the passage, each port that is opened will remain opened until the last port (for piston area #5) is opened whereby the application of pressure to the piston areas is successive or additive in effect. This operation is illustrated in the diagrammatic sequence of Figure 10 wherein the valve land is moving to the left relative to the ports and it will be seen that port #1 will start to open first, and then ports # 2, #3, #4 and #5 will open in sequence until all are in communication with the high pressure fluid.

Because the other bordering reach of the land is also angularly disposed and divergent, the ports will be closed in reverse order, with port #5 being closed first and port #1 being closed last. The pressure therefore will be applied to piston area #1 for the longest period of time and to piston area #5 for the shortest period of time, and this is illustrated in the time-pressure diagram of Figure 5 wherein the time is plotted along the horizontal axis. In this diagram, block #1 represents the force applied to piston area #1, block #2 the force applied to piston area #2, etc.; and the diagram as a whole illustrates the method by which the output force of the various piston areas is added together for varying lengths of time in order to produce an effective sinusoidal rise and fall in the force on each side of the piston. Thus, the first half of the cycle represents the connection of the upper piston areas to the high pressure fluid through ports 65, and the second half of the cycle represents the subsequent connection of the lower piston areas to the high pressure fluid through the ports 64 as the valve continues to rotate. Moreover, since there is an overlapping in the sequential opening and closing of the ports, as shown in Figure 10, a relatively smooth sine wave form is obtained.

As soon as the high pressure fluid is cut off from each piston area, the valve 22 connects the area to the low pressure fluid passage 44 which are maintained at an approximately constant pressure. This connection allows the fluid in these inoperative areas to move freely without creating any restrictive force on the motion of the piston.

Since the valve rotor 22 has a multiple number of paired high and low pressure passages, the relative motion of the valve causes the number of complete cycles of piston vibration per revolution of the valve to be equal to the number of high pressure passages therein. By employing a greater number of high and low pressure passages, a higher frequency can be obtained without requiring additional rotor speed.

By using two or more high pressure passages in the valve, a condition of hydraulic balance is obtained for the valve which minimizes bearing loading and wear on the sides of the valve housing. By using an equal number of ports and high pressure valve passages for each piston area, flow is obtained simultaneously through all of the high pressure passages to the port paths. In this connection, it will be noted that the fluid flow occurs simultaneously along all three high or low pressure passages, all of the corresponding port paths and thence into the piston areas at three equally distributed points. This results in very uniform flow distribution and reduces fluid friction losses.

The valve rotor 22 is hydraulically balanced not only radially but axially through the use of the cylindrical or spool-like bearing surfaces 37, 38 and 39 through which the fluid is introduced and exhausted. The projected areas of the valve rotor therefore are equal in either direction along the axis and the forces produced on these areas by the hydraulic pressure are thus substantially equal and opposite and tend to cancel each other.

In the hydraulic vibrator disclosed herein, it is not necessary to employ a separate pump for the low pressure side of the vibrator since there is sufficient leakage from the high pressure passages to provide an adequate source of low pressure oil and prevent cavitation. Moreover, the return path for the oil through the valve eliminates the need for any external lines or conduits at the upper part of the vibrator and provides an uninterrupted attachment area on the external surface of the piston.

To provide for the return of oil which leaks by the upper bearing surface 37 of the valve rotor, one or more ports 67, Figure 1, are formed in the top cap 68 of the stator. These ports allow the oil to pass into a chamber 70 inside the top cap or cover 71 on the piston from whence the oil drains through a plurality of passages 72 extending lengthwise through the piston, each such passage being encircled by a suitable seal 74 where the upper and lower rams of the piston meet. The passages 72 terminate at an annular chamber 75 between the piston and a ring member 76 affixed to the base block 24, and this chamber communicates by means of vertical ports 77 with an annular passage 78 in the ring member. From the passage 78, the oil is returned to the oil reservoir or sump through a drain passage 80 and a suitable conduit (not shown). To prevent external leakage of oil, only one point below the lower edge of the piston requires a positive seal between the relatively moving surfaces. This is accomplished through the use of a flexible boot 81 which absorbs the relative axial motion of the piston.

Even though equal fluid pressure were to be applied alternately to opposite sides of the piston, slight variations in flow and friction would cause the piston to drift toward one side and prevent full designed travel in both directions. Therefore it is necessary to have a centering mechanism which will not only correct this drift but which also has sufficient force capacity to support an external load which is attached to the piston.

The centering is achieved by means of a hydraulic suspension which consists of two sections. The low pressure fluid is applied through ports 82 in the upper portion of the stator to a small ring area 84 at the upper end of the piston. This causes the piston to always tend to move towards the base irrespective of the direction in which the vibrator is mounted. Oil leaks from the bottom side of the piston past the sliding surfaces into an annular area 85 at the end of the piston adjacent to the base. This oil is at an average pressure that is somewhat greater than the low pressure applied to the opposite end of the piston. Since both the area and the pressure at the lower side of the piston are greater than that of the opposite side, the piston rises until its lower edge passes a plurality of small adjustable orifices 87 in the ring 76, which orifices may be adjusted by needle valves 88. As these orifices are opened, the pressure in the area 85 drops until the force at both ends of the piston are equal, at which time the hydraulic centering effect comes to a halt. However, it is important that this centering and supporting effect be maintained at an approximately uniform force while the piston vibrates rapidly back and forth and this condition is attained by connecting a small accumulator, indicated diagrammatically at 91, to the lower area 85 by means of a passage 90. A gas charge in the accumulator acts as a spring with a low spring rate and maintains an approximately constant pressure for small changes of volume.

The speed at which the valve rotor is rotated determines the frequency of the vibration. With a valve rotor that contains three high pressure slots and three low pressure slots, it is necessary to rotate the valve rotor at a speed of 12,000 r.p.m. to produce a frenquency of 600 c.p.s.

Since this shaft speed is faster than the output obtainable from the usual commercial variable speed drives, a step-up speed transmission is usually employed.

In the arrangement shown, a small stub shaft 92 is mounted below the base of the vibrator, the shaft being journalled in bearings 94. On the lower end of this stub shaft is a small diameter sprocket 95. The variable speed drive would have a larger diameter sprocket (not shown) mounted on its output shaft. A timing belt or similar transmission belt, capable of high pitch line velocity, connects the two sprockets.

Mounted on the upper end of the stub shaft 92 is a splined collar 97 which is connected by a splined coupling 98 to the plug 55 which is inserted in the bottom of the valve rotor 22. This splined coupling takes up any slight misalignment and prevents any force loading due to misalignment from being applied to the valve rotor. A conventional high speed seal 100 is mounted at the inside end of the shaft cartridge to prevent oil which is draining back to the sump of the oil pump from leaking out past the bearings 94, the oil which leaks past the lower valve bearing surface 39 being allowed to pass through annular chambers 101, 102 and out through a suitable port 104. The shaft cartridge assembly can be easily replaced by a direct drive whenever it is convenient to use that type of variable speed drive.

The sinusoidal force output of a vibrator is usually expressed in terms of the peak force produced during each half cycle of vibration. In the hydraulic vibrator disclosed herein, the peak force produced is equal to the sum of the piston areas on one side of the piston multiplied by the pressure differential between the high pressure and low pressure. With hydraulic fluid furnished at a pressure of 2200 p.s.i. to the high pressure passages and at a pressure of 200 p.s.i. to the low pressure passages, the resultant differential pressure of 2000 p.s.i. applied to a total additive piston area of 15 sq. in. would generate a peak force of 30,000 pounds. This force output remains very uniform over the frequency range since the valve does not rely upon throttling to modulate the sinusoidal wave form.

To secure a higher force output than is convenient from a single unit, several units can be operated simultaneously by interconnecting the drives to the valve rotors so that the pistons will move in phase.

From the foregoing description, it will be apparent that the invention disclosed herein provides a novel hydraulic vibrator which is capable of converting constant pressure into sinusoidal vibration and obtaining both high frequencies and high force output. The concentric arrangement of the valve and piston results in a very compact construction which has several advantages. Thus, whereas the usual hydraulic mechanism would have a valve consisting of a valve body and valve spool connected through individual lines to a separate hydraulic cylinder consisting of a cylinder body, piston, piston rod and cylinder heads, this mechanism has only three principal parts. The slots of the valve rotor function not only to apply pressure for proportionate periods of time but also serve as large flow paths for bringing oil into the cylinder structure. The stator functions as both a valve body and a cylinder body. The piston, which would be conventionally located internally with respect to the cylinder body, is in this mechanism located externally of the cylinder body and this makes it possible to employ direct attachments to external surfaces without the use of conventional piston rod structure.

As will be apparent to those familiar with the art, the invention may be embodied in other specific forms without departing from the spirit or essential characteristics thereof. The embodiment disclosed is therefore to be considered in all respects as illustrative rather than restrictive, the scope of the invention being indicated by the appended claims.

What is claimed is:

1. In a device of the character described, a stator member, a valve element rotatably mounted in the interior of said stator member, piston means engaging the exterior of said stator member, said piston means being mounted on said stator member for reciprocable movement relative thereto, a source of hydraulic fluid under pressure, and coacting means in said valve element and stator member operable when the element is rotating to alternately direct fluid to opposite sides of said piston means and cause reciprocation of same.

2. In a device of the character described, a stator member, piston means encircling said stator member in coaxial relation thereto, said piston means being mounted for reciprocable axial movement on said stator member and having oppositely disposed piston areas confronting portions of the exterior of the member, a valve rotor mounted in the interior of said stator member, a source of hydraulic fluid, and coacting means in said valve and stator member operable when the valve is rotating to alternately direct fluid to said oppositely disposed piston areas and cause reciprocation of said piston means.

3. In a device of the character described, a stator member, a hollow piston encircling said stator member in coaxial relation thereto, said piston being mounted for reciprocable axial movement on said stator member and being formed with oppositely disposed piston areas in the interior thereof, a valve rotor mounted in the interior of said stator member, a source of hydraulic fluid, and coacting fluid passages in said valve and stator member operable when the valve is rotating to direct fluid into the interior of said piston alternately against said oppositely disposed piston areas thereby causing reciprocation of the piston.

4. In a device of the character described, a stator member, a hollow piston encircling said stator member in coaxial relation thereto, said piston being mounted for reciprocable axial movement on said stator member and being formed with a plurality of pairs of independent piston areas in the interior thereof, the piston areas in each pair being on opposite sides of said piston, a valve rotor mounted in the interior of said stator member, a source of hydraulic fluid under pressure, and coacting means in said valve and stator member operable when the valve is rotating to alternately direct fluid to the piston areas on opposite sides of said piston thereby causing the latter to reciprocate.

5. In a hydraulic vibrator, a stator member, a hollow piston encircling said stator member in coaxial relation thereto, said piston being mounted for reciprocable axial movement on said stator member and having in its interior a plurality of pairs of annular shoulders arranged in stepped relation axially of the piston from its mid-section to each end, a valve rotor mounted in the interior of said stator member, a source of hydraulic fluid, and coacting fluid passages in said valve and stator member operable when the valve is rotating to alternately direct fluid to the annular shoulders on opposite sides of said piston thereby causing the latter to reciprocate.

6. In a hydraulic vibrator, a stator member, a hollow piston encircling said stator member in coaxial relation thereto, said piston being mounted for reciprocable axial movement relative to said stator member and being formed in its interior with a plurality of pairs of annular shoulders arranged in stepped relation axially of the piston from its mid-section to each end, said stator member being formed on its exterior with a plurality of pairs of stepped annular shoulders corresponding to and confronting the shoulders on said piston, said piston shoulders being spaced from said stator shoulders in mid-position of the piston, a source of hydraulic fluid, and means to direct the fluid alternately against the piston shoulders on opposite sides of the piston thereby causing the latter to reciprocate.

7. In a hydraulic vibrator, a piston assembly comprising an elongated stator member and a hollow elongated piston encircling said stator member in coaxial relation thereto, said piston being mounted for reciprocable axial movement relative to said stator member and being formed in its interior with a plurality of pairs of annular shoulders arranged in stepped relation axially of the piston from its mid-section to each end, said shoulders lying in planes normal to the axis of said piston and being separated by axially extending cylindrical surfaces whereby each shoulder forms an independent piston area, said stator member being formed on its exterior with a plurality of pairs of stepped annular shoulders corresponding to and confronting the shoulders on said piston, said stator shoulders lying in planes normal to the stator axis and being separated by axially extending cylindrical surfaces in sliding engagement with the corresponding cylindrical surfaces of said piston, said piston shoulders being spaced from said stator shoulders in mid-position of the piston to form a fluid receiving chamber adjacent each piston area.

8. In a hydraulic vibrator, an elongated stator member having a central axial passageway, a hollow elongated piston encircling said stator member in coaxial relation thereto, said piston being mounted for reciprocable axial movement relative to said stator member and being formed in its interior with a plurality of pairs of annular shoulders arranged in stepped relation axially of the piston from its mid-section to each end, said shoulders being equal in area and separated from one another by axially extending cylindrical surfaces whereby each shoulder forms an independent piston area, said stator member being formed on its exterior with a plurality of pairs of stepped annular shoulders corresponding to and confronting the shoulders on said piston, said stator shoulders being separated from one another by axially extending cylindrical surfaces in sliding engagement with the corresponding cylindrical surfaces of said piston, said piston shoulders being spaced from said stator shoulders in mid-position of the piston to define a fluid receiving chamber adjacent each piston area, fluid passages in said stator member extending from each of said fluid receiving chambers to said stator central passageway, a source of high pressure hydraulic fluid, means connecting said fluid source with said central passageway, and valve means in said central passageway operable to successively open and close the passages for the fluid chambers on first one side of said piston and then the other side whereby the high pressure fluid produces substantially sinusoidal motion of the piston.

9. In a device of the character described, a stator member having a central axial passageway, a hollow piston encircling said stator member in a coaxial relation thereto, said piston being mounted for reciprocable axial movement on said stator member and having a plurality of pairs of independent piston areas formed in the interior thereof, the piston areas in each pair being on opposite sides of said piston, fluid passages in said stator member extending between each of said piston areas and said central passageway, a valve element rotatably mounted in said central passageway, means to admit high pressure hydraulic fluid into said central passageway, and means on said valve operable when the latter is rotating to successively open and close the fluid passages for the piston areas on first one side of said piston and then the other side whereby the high pressure fluid produces substantially sinusoidal motion of the piston.

10. In a hydraulic vibrator, a stator member having a central axial passageway, a valve element rotatably mounted in said passageway, said valve having a plurality of high pressure fluid passages and a like number of low pressure fluid passages therein, a hollow piston encircling said stator member in coaxial relation thereto, said piston being mounted for reciprocable axial movement on said stator member and having in its interior a plurality of pairs of annular shoulders arranged in stepped relation axially of the piston from its mid-section to each end, a plurality of fluid passages in said stator member extending from points adjacent each of said annular piston shoulders to said central passageway, there being as many such stator passages for each shoulder as high pressure fluid passages in said valve, means to admit high pressure fluid to said high pressure valve passages, and means on said valve operable during its rotation to successively connect said high pressure valve passages with the stator fluid passages for the piston shoulders on first one side of the piston and then the other side whereby the high pressure fluid produces substantially sinusoidal motion of the piston.

11. In a hydraulic vibrator, a stator member having a central axial passageway, a valve element rotatably mounted in said passageway, said valve being formed with a plurality of independent high pressure fluid passages and a like number of independent low pressure fluid passages, said high and low pressure passages being alternately disposed about the periphery of said valve, a hollow piston encircling said stator member in coaxial relation thereto, said piston being mounted for reciprocable axial movement on said stator member and being formed in its interior with a plurality of pairs of annular shoulders arranged in stepped relation axially of the piston from its mid-section to each end, said shoulders being equal in area and separated from one another by axially extending cylindrical surfaces whereby each shoulder forms an independent piston area, a plurality of groups of radially extending fluid passages in said stator member which passage groups extend alternately to opposite sides of said piston from said central passageway, the number of passages in each group being equal to the number of piston areas on one side of said piston and each passage in the group terminating at a point adjacent one of said piston areas, there being as many groups of passages for each side of the piston as there are high pressure fluid passages in said valve, and means to admit high pressure fluid to said high pressure valve passages, said valve being operable when rotating to successively open and close the fluid passages in each of said groups to first a high pressure valve passage and then a low pressure valve passage whereby substantially sinusoidal motion of said piston is obtained, the number of cycles of vibration of said piston per revolution of the valve being equal to the number of high pressure fluid passages in said valve.

12. In a hydraulic vibrator, an elongated stator member having a central axial passageway therethrough, a valve element rotatably mounted in said passageway in coaxial relation to said stator member, said valve being formed with a sinuous land having a sliding fit with the wall of said passageway, said valve land defining a plurality of independent high pressure fluid passages and an equal number of independent low pressure fluid passages in said valve, said high and low pressure passages being alternately disposed about the periphery of said valve intermediate adjacent reaches of said land, a hollow elongated piston encircling said stator member in coaxial relation thereto, said piston being mounted for reciprocable axial movement relative to said stator member and being formed in its interior with a plurality of pairs of annular shoulders arranged in stepped relation axially of the piston from its mid-section to each end, said shoulders lying in planes normal to the axis of said piston and being separated by axially extending cylindrical surfaces whereby each shoulder forms an independent annular piston area, said stator member being formed on its exterior with a plurality of pairs of stepped annular shoulders corresponding to and confronting the shoulders of said piston, said stator shoulders lying in planes normal to the stator axis and being separated by axially extending cylindrical surfaces in sliding engagement with the corresponding cylindrical surfaces of said piston, said piston shoulders being spaced from said stator shoulders in mid-position of the piston to form an annular fluid receiving chamber adjacent each piston area, a plurality of fluid passages in said stator member extending radially inwardly from each of said fluid chambers to said central passageway, each of said fluid chambers having one such passage for each high pressure passage in said valve, said stator fluid passages corresponding to each high pressure valve passage being arranged in axially aligned groups for the chambers on each side of said piston, said groups of passages to the opposite sides of said piston being alternately arranged around said stator member with uniform spacing therebetween, and means to admit high pressure fluid to said high pressure valve passages, said sinuous valve land being operable when the valve is rotating to successively open and close the fluid passages in each of said groups to first a high pressure valve passage and then a low pressure valve passage whereby substantially sinusoidal motion of said piston is obtained, the number of cycles of vibration of said piston per revolution of the valve being equal to the number of high pressure fluid passages in said valve.

13. In a hydraulic vibrator having a stator member and an external piston mounted for reciprocable movement on said stator member, a valve rotor adapted to be mounted within said stator member to control the delivery of a high pressure fluid to said piston in a predetermined manner, said valve comprising an elongated substantially cylindrical body formed with a continuous land of generally sinusoidal configuration, said land defining a plurality of alternately arranged high and low pressure fluid passages in said valve whereby the valve is hydraulically balanced radially, said high pressure fluid passages being in communication with one another on one side of said land and said low pressure fluid passages being in communication with one another on the other side of said land.

14. Structure as defined in claim 13 wherein said valve rotor includes a plurality of cylindrical bearing surfaces adjacent the ends thereof through which fluid is introduced and exhausted so that the projected areas of said valve are equal in either direction along the axis thereof and the forces produced on said areas by the hydraulic pressure are substantially equal and opposite, whereby the valve is hydraulically balanced axially as well as radially.

15. Structure as defined in claim 13 together with coacting means in said stator member and external piston for centering said piston by hydraulic suspension to permit full utilization of the piston stroke.

16. In a hydraulic vibrator including an elongated stator member and an external piston mounted for reciprocable movement on said stator member, said stator member having a central axial passageway therethrough, an elongated valve rotor adapted to be coaxially mounted within said stator member passageway to control the delivery of a high pressure fluid to said piston in a predetermined manner, said valve comprising a substantially cylindrical body formed with a continuous land of generally sinusoidal configuration, the up and down reaches of said land being elongated in the axial direction of the valve and having a sliding fit with the wall of said stator passageway, said land defining a plurality of independent high pressure fluid passages and a like number of independent low pressure fluid passages in said valve, said high and low pressure passages being alternately disposed about the periphery of said valve intermediate adjacent reaches of said land, said high pressure fluid passages being in communication with one another on one side of said land and said low pressure fluid passages being in communication with one another on the other side of said land, said valve also being formed with a central axial passageway therein, and means in said valve connecting each of said low pressure fluid passages with said central passageway.

References Cited in the file of this patent

UNITED STATES PATENTS

| 608,483 | Sellers | Aug. 2, 1898 |
| 2,867,191 | Herrmann | Jan. 6, 1959 |

FOREIGN PATENTS

| 605,680 | Great Britain | July 28, 1948 |